United States Patent
Bradley et al.

(10) Patent No.: US 10,460,091 B2
(45) Date of Patent: *Oct. 29, 2019

(54) SUPPLEMENTAL HAND GESTURE AUTHENTICATION

(71) Applicant: International Business Machines Corporation, Armonk, NY (US)

(72) Inventors: Lisa Wood Bradley, Cary, NC (US); Liam Harpur, Skerries (IE); Aaron J. Quirk, Cary, NC (US); Lin Sun, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/848,394

(22) Filed: Dec. 20, 2017

(65) Prior Publication Data

US 2018/0232505 A1 Aug. 16, 2018

Related U.S. Application Data

(63) Continuation of application No. 15/429,676, filed on Feb. 10, 2017.

(51) Int. Cl.
*G06F 21/31* (2013.01)
*G06F 21/32* (2013.01)

(52) U.S. Cl.
CPC ............ *G06F 21/316* (2013.01); *G06F 21/32* (2013.01); *G06F 2221/2139* (2013.01)

(58) Field of Classification Search
CPC . G06F 21/316; G06F 21/32; G06F 2221/2139
See application file for complete search history.

(56) References Cited

U.S. PATENT DOCUMENTS 8,326,568 B2 12/2012 Hsu et al.
8,949,974 B2 * 2/2015 Narendra .............. H04M 1/673
380/241

(Continued)

OTHER PUBLICATIONS

"Motion gesture authentication", retrieved from https://calhacks.devpost.com/submissions/27903-motion-gesture-authentication; Aug. 2016.

(Continued)

*Primary Examiner* — Mohammed Waliullah
(74) *Attorney, Agent, or Firm* — Brown & Michaels, PC; Michael O'Keefe (57) ABSTRACT

Providing supplemental authentication of a user based on hand gesture activity of a user with an application of a device after a user has completed a successful authentication challenge to initially access the device. Hand gesture activity of the user with the device is recorded during current use of an application of the device. The recorded hand gesture activity during current use of an application of the device is compared to previous recorded hand gesture activity during use of the same application of the device by an authorized user to provide a supplemental authentication of the user. When the recorded hand gesture activity does not match the previously recorded hand gesture activity during use of the same application, the use of the application on the device is halted and an additional authentication challenge requiring input from the user is presented to the user.

5 Claims, 4 Drawing Sheets

(56) References Cited

U.S. PATENT DOCUMENTS

| | | | |
|---|---|---|---|
| 8,963,859 B2 | 2/2015 | Wang | |
| 8,984,591 B2 | 3/2015 | McFarland | |
| 9,082,117 B2* | 7/2015 | Chin | G06F 3/04883 |
| 9,134,835 B2 | 9/2015 | Novak et al. | |
| 9,158,904 B1* | 10/2015 | Ross | G06K 9/00214 |
| 9,348,989 B2* | 5/2016 | Herger | G06F 21/32 |
| 9,355,236 B1* | 5/2016 | Kratz | G06F 21/32 |
| 9,465,930 B2* | 10/2016 | Alten | G06F 21/32 |
| 9,519,769 B2* | 12/2016 | Azar | H04W 12/06 |
| 9,773,158 B2* | 9/2017 | Lee | G06K 9/00268 |
| 2009/0083850 A1* | 3/2009 | Fadell | G06F 21/316 |
| | | | 726/19 |
| 2011/0093820 A1* | 4/2011 | Zhang | A63F 13/06 |
| | | | 715/863 |
| 2011/0197263 A1* | 8/2011 | Stinson, III | G06F 3/011 |
| | | | 726/4 |
| 2011/0282785 A1 | 11/2011 | Chin | |
| 2012/0054057 A1* | 3/2012 | O'Connell | G06F 21/36 |
| | | | 705/26.1 |
| 2012/0081282 A1* | 4/2012 | Chin | G06F 3/011 |
| | | | 345/156 |
| 2012/0166944 A1* | 6/2012 | Cotterill | G06F 3/0483 |
| | | | 715/702 |
| 2014/0189603 A1* | 7/2014 | Adams | G06F 3/04883 |
| | | | 715/863 |
| 2014/0283016 A1 | 9/2014 | Sambamurthy et al. | |
| 2015/0113633 A1* | 4/2015 | Yeom | H04L 63/083 |
| | | | 726/18 |
| 2015/0199504 A1 | 7/2015 | Feng et al. | |
| 2015/0213244 A1* | 7/2015 | Lymberopoulos | G06F 21/32 |
| | | | 726/18 |
| 2016/0050308 A1* | 2/2016 | Liu | H04W 52/0209 |
| | | | 455/411 |
| 2016/0063230 A1 | 3/2016 | Alten | |
| 2016/0078289 A1* | 3/2016 | Michel | G06T 7/73 |
| | | | 345/156 |
| 2016/0371477 A1 | 12/2016 | Boss et al. | |

OTHER PUBLICATIONS

Guse, D. "Gesture-based User Authentication on Mobile Devices using Accelerometer and Gyroscope", Berlin Institute of Technology; Aug. 2011.

Sherman et al. "User-Generated Free-Form Gestures for Authentication: Security and Memorability", MobiSys '14 Proceedings of the 12th annual international conference on Mobile systems, applications, and services; Jun. 2014.

Guerra-Casanova et al. "Authentication in mobile devices through hand gesture recognition", International Journal of Information and Security, vol. 11, Issue 2, pp. 65-83; Apr. 2012.

"Protect Your Mobile Device", retrieved from https://www.fcc.gov/consumers/guides/protect-your-mobile-device; as early as Jun. 2016.

"Microsoft Takes Biometric Authentication to the Next Level for Mobile Devices & More", retrieved from http://www.patentlymobile.com/2015/08/microsoft-takes-biometric-authentication-to-the-next-level-for-mobile-devices-and-more.html; Aug. 2015.

"Apple reveals new Password Gestures to Strengthen the Authentication Process of Future iDevices and Macs", retrieved from http://www.patentlyapple.com/patently-apple/2014/04/apple-reveals-new-password-gesture-process-to-strengthen-the-authentication-process-of-future-idevices-and-macs.html; Aug. 2014.

"Samsung Invents Biosignal Authentication for Gear Smartwatch", retrieved from http://www.patentlymobile.com/2015/03/samsung-invents-biosignal-authentication-for-gear-smartwatch.html; Mar. 2015.

List of related applications; Dec. 19, 2017.

* cited by examiner

SUPPLEMENTAL HAND GESTURE AUTHENTICATION

BACKGROUND

The present invention relates to authentication of a user of a device, and more specifically to supplemental hand gesture authentication of a user of a device.

The theft of wireless devices, particularly smartphones, is very common and an increasing problem across the world. The high resale value of these wireless devices and the personal information contained on the devices can be used by others once a single authentication to access the device itself has been passed.

SUMMARY

According to one embodiment of the present invention, a method of supplemental authentication based on hand gesture activity of a user with an application of a device computer is disclosed. The method comprising the steps of: after a user has completed a successful authentication challenge to initially access at least the device computer, the device computer recording hand gesture activity of the user during current use of an application of the device computer; the device computer comparing the recorded hand gesture activity of the user during current use of the application of the device computer to previous recorded hand gesture activity during use of a same application of the device computer to provide a supplemental authentication of the user of the device computer; and when the recorded hand gesture activity of the user does not match the previously recorded hand gesture activity during use of the same application, the use of the application of the device computer is halted and an additional authentication challenge requiring input from the user is presented to the user.

According to another embodiment of the present invention, a computer program product for supplemental authentication based on hand gesture activity of a user with an applications of a device computer is disclosed. The device computer comprising at least one processor, one or more memories, one or more computer readable storage media, the computer program product comprising a computer readable storage medium having program instructions embodied therewith, the program instructions executable by the computer to perform a method comprising: after a user has completed a successful authentication challenge to initially access the application and the device computer, recording, by the device computer, hand gesture activity of the user during current use of an application of the device computer; comparing, by the device computer, the recorded hand gesture activity of the user during current use of the application of the device computer to previous recorded hand gesture activity during use of a same application of the device computer to provide a supplemental authentication of the user of the device computer; and when the recorded hand gesture activity of the user does not match the previously recorded hand gesture activity during use of the same application, the use of the application of the device computer is halted and an additional authentication challenge requiring input from the user is presented to the user.

According to another embodiment of the present invention, a computer system for supplemental authentication based on hand gesture activity of a user with an application of a device computer is disclosed. The device computer comprising a computer comprising at least one processor, one or more memories, one or more computer readable storage media having program instructions executable by the computer to perform the program instructions comprising: after a user has completed a successful authentication challenge to initially access the application and the device computer, recording, by the device computer, hand gesture activity of the user during current use of an application of the device computer; comparing, by the device computer, the recorded hand gesture activity of the user during current use of the application of the device computer to previous recorded hand gesture activity during use of a same application of the device computer to provide a supplemental authentication of the user of the device computer; and when the recorded hand gesture activity of the user does not match the previously recorded hand gesture activity during use of the same application, the use of the application of the device computer is halted and an additional authentication challenge requiring input from the user is presented to the user.

According to another embodiment of the present invention a method of supplemental authentication based on hand gesture activity of a user with a plurality of applications of a device computer after a user has completed a successful authentication challenge to initially access at least the device computer is disclosed. The method comprising the steps of: the device computer recording hand gesture activity of the user during current use of one of the plurality of applications of the device computer; the device computer comparing the recorded hand gesture activity of the user during current use of one of the plurality of applications of the device computer to previous recorded hand gesture activity during use of the same application of the device computer to provide a supplemental authentication of the user of the device computer; and when the recorded hand gesture activity of the user does not match the previously recorded hand gesture activity during use of the same application, the use of the application of the device computer is halted and an additional authentication challenge requiring input from the user is presented to the user.

DETAILED DESCRIPTION

In an embodiment of the present invention, it is recognized that the supplemental hand gesture authentication system can increase owner protection of the device without asking the users to spend time satisfying additional authentication challenges and aid in protecting confidential data on the device from being accessed by an unauthorized user, decreasing the availability of data and usability of the device for an unauthorized user.

It should be noted that embodiments of the present invention are not concerned with how a user is holding the device during authentication or during the repetition of a specific gesture to answer an authentication challenge. Instead, the embodiments of the present invention are using at least hand gesture input during activities other than answering an authentication challenge, with the activities taking place after an initial authentication challenge has been passed to determine whether an authorized user is still utilizing or accessing the device computer. The initial authorization may be of the device computer, an application or both.

Figure 1:
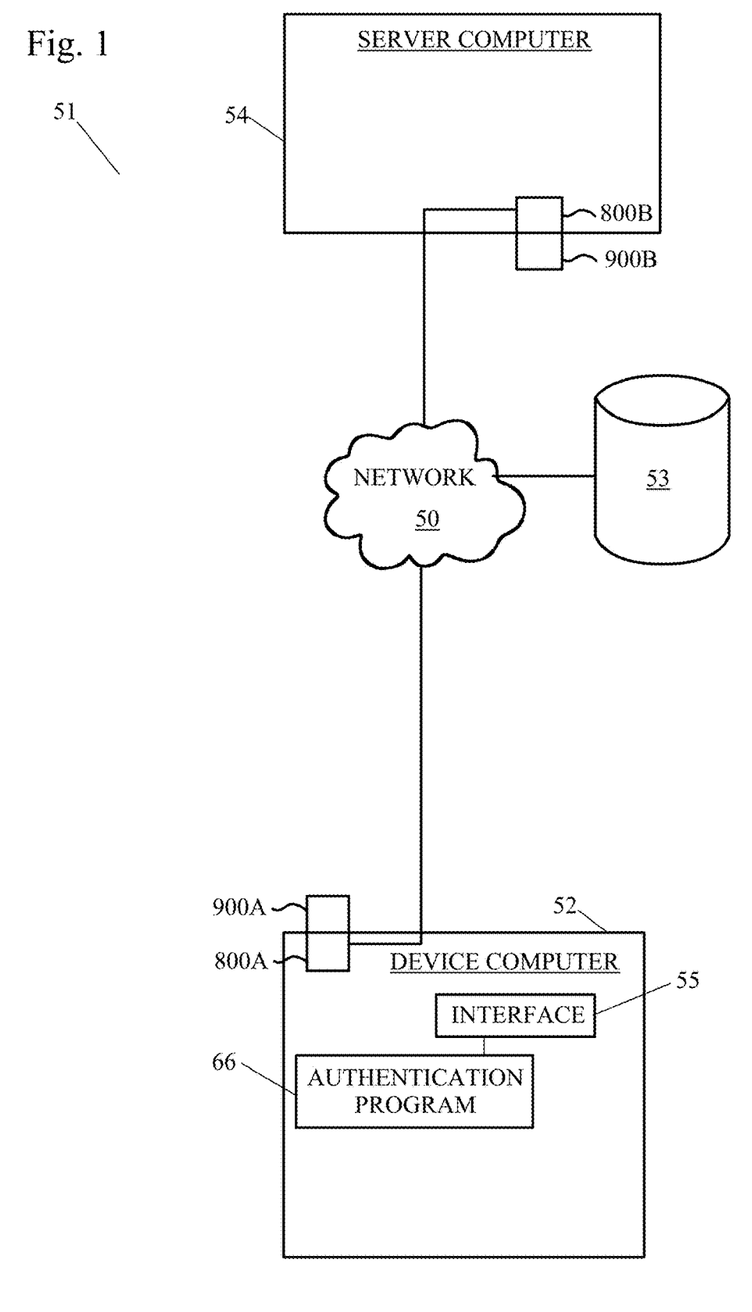
FIG. 1 depicts an exemplary diagram of a possible data processing environment in which illustrative embodiments may be implemented.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, device computer 52, a repository 53, and a server computer 54 connect to network 50. In other exemplary embodiments, network data processing system 51 may include additional client or device computers, storage devices or repositories, server computers, and other devices not shown.

The device computer 52 may contain at least one interface 55, which may accept commands and data entry from a user. The commands may be regarding authentication to unlock the device computer or further use of the device computer by a user. Additionally, information regarding the grip, angle and other gestures associated with the user's hand and interaction with any or all of the interfaces of the device computer may provide input regarding the identity of the user of the device computer 52 through sensors on an edge or an interface of the device computer 52. The at least one interface 55 can be, for example, a command line interface, a graphical user interface (GUI), a natural user interface (NUI) or a touch user interface (TUI). The device computer also preferably contains a gyroscope to determine orientation and/or an angle at which the device computer 52 is being held by a user, as well as a camera to determine how close the user holds the device computer 52 relative to their face. Temperature sensors and tactile pressure sensors 846 may also be integrated into the device computer 52 and may be part of the interface 55 when at least one of the interfaces is a TUI. More than one tactile pressure sensor may be present. Furthermore, edge sensors for detecting an edge tactile touch of the device computer 52 may also be used to determine how a user is wrapping their hand around a touchscreen of the device computer 52. The edge sensors may be used to detect an angle of a finger of a user that is in contact with an edge of the device computer 52.

Figure 4:
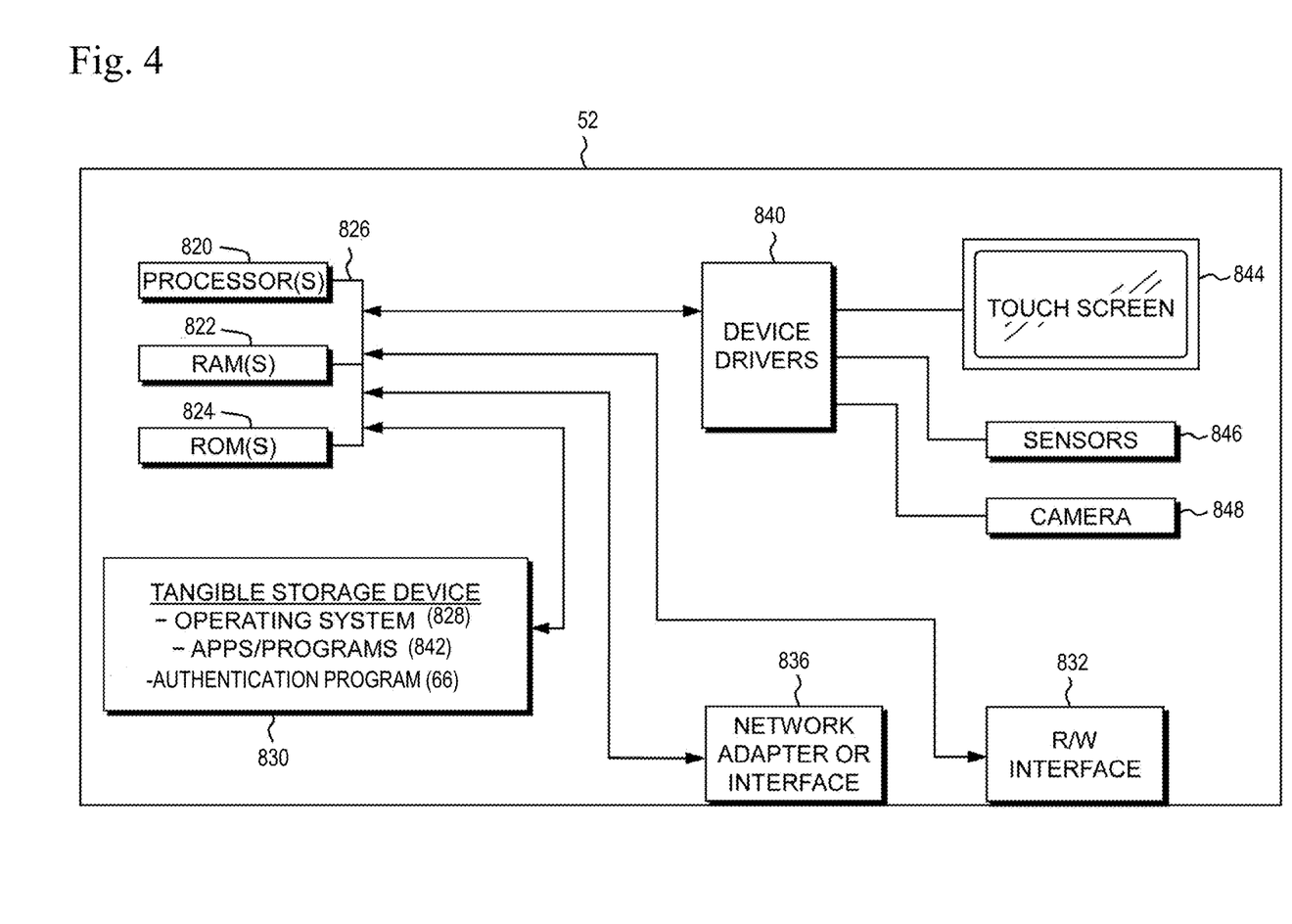
FIG. 4 is a block diagram of components of a device computer in which illustrative embodiments may be implemented.

The device computer 52 preferably includes authentication program 66. While not shown, it may be desirable to have the authentication program 66 be present on the server computer 54. FIG. 4 shows a block diagram of components of a device computer in which illustrative embodiments may be implemented.

Repository 53 or alternatively a storage device 830, 936 of the device computer 52 contains past behavior of an authorized user during the authorized user's activity with each application of the device computer 52.

Figure 3:
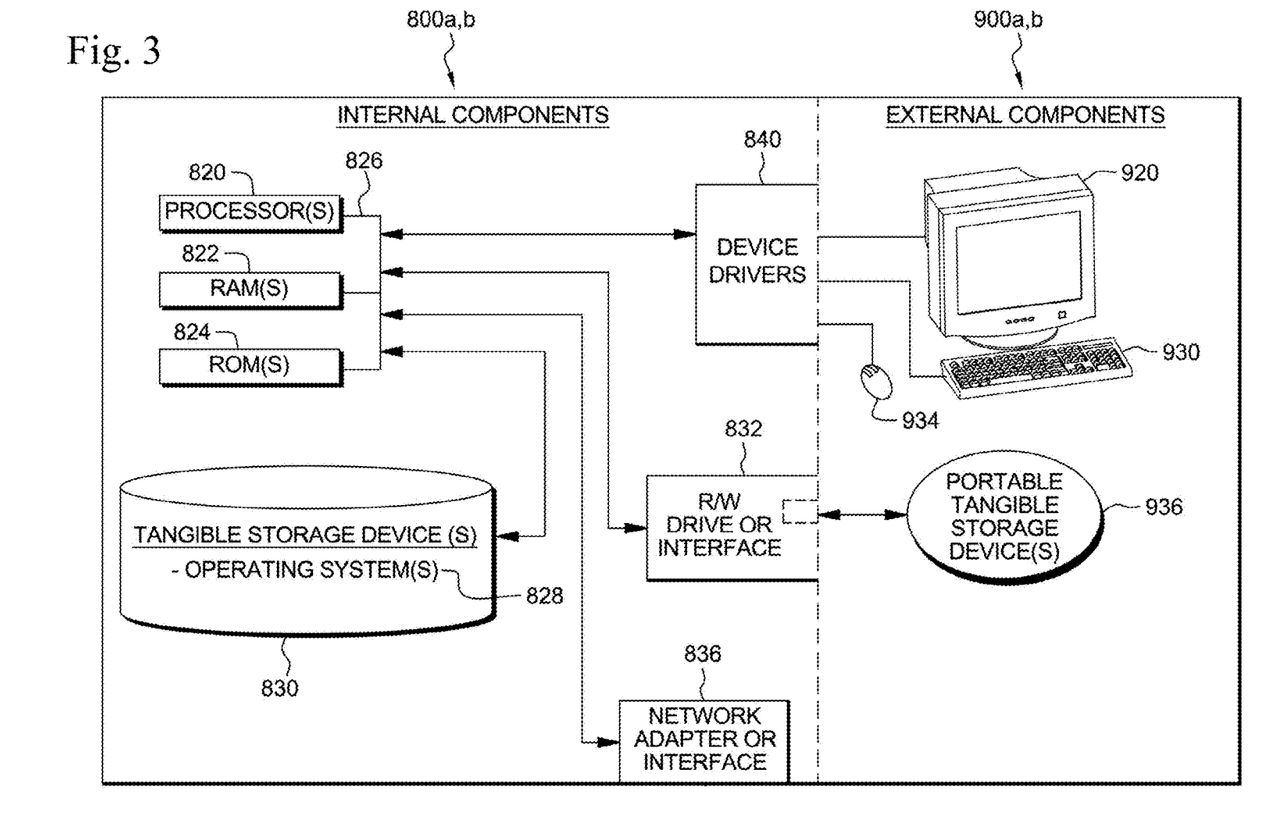
FIG. 3 illustrates internal and external components of a server computer in which illustrative embodiments may be implemented.

Server computer 54 includes a set of internal components 800b and a set of external components 900b illustrated in FIG. 3. In the depicted example, server computer 54 provides information, such as boot files, operating system images, and applications to the device computer 52. Server computer 54 can compute the information locally or extract the information from other computers on network 50. The server computer 54 may contain the authentication program 66.

Program code and programs such as authentication program 66 may be stored on at least one of one or more computer-readable tangible storage devices 830 shown in FIG. 3, on at least one of one or more portable computer-readable tangible storage devices 936 as shown in FIG. 3, or on storage unit 53 connected to network 50, or may be downloaded to a device computer 52 or server computer 54, for use. For example, program code and programs such as authentication program 66 may be stored on at least one of one or more storage devices 830 on server computer 54 and downloaded to device computer 52 over network 50 for use. Alternatively, server computer 54 can be a web server, and the program code, and programs such as authentication program 66 may be stored on at least one of the one or more storage devices 830 on server computer 54 and accessed device computer 52. In other exemplary embodiments, the program code, and programs such as authentication program 66 may be stored on at least one of one or more computer-readable storage devices 830 on device computer 52 or distributed between two or more servers.

In the depicted example, network data processing system 51 is the Internet with network 50 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 51 also may be implemented as a number of different types of networks, such as, for example, an intranet, local area network (LAN), or a wide area network (WAN). FIG. 1 is intended as an example, and not as an architectural limitation, for the different illustrative embodiments.

Figure 2:
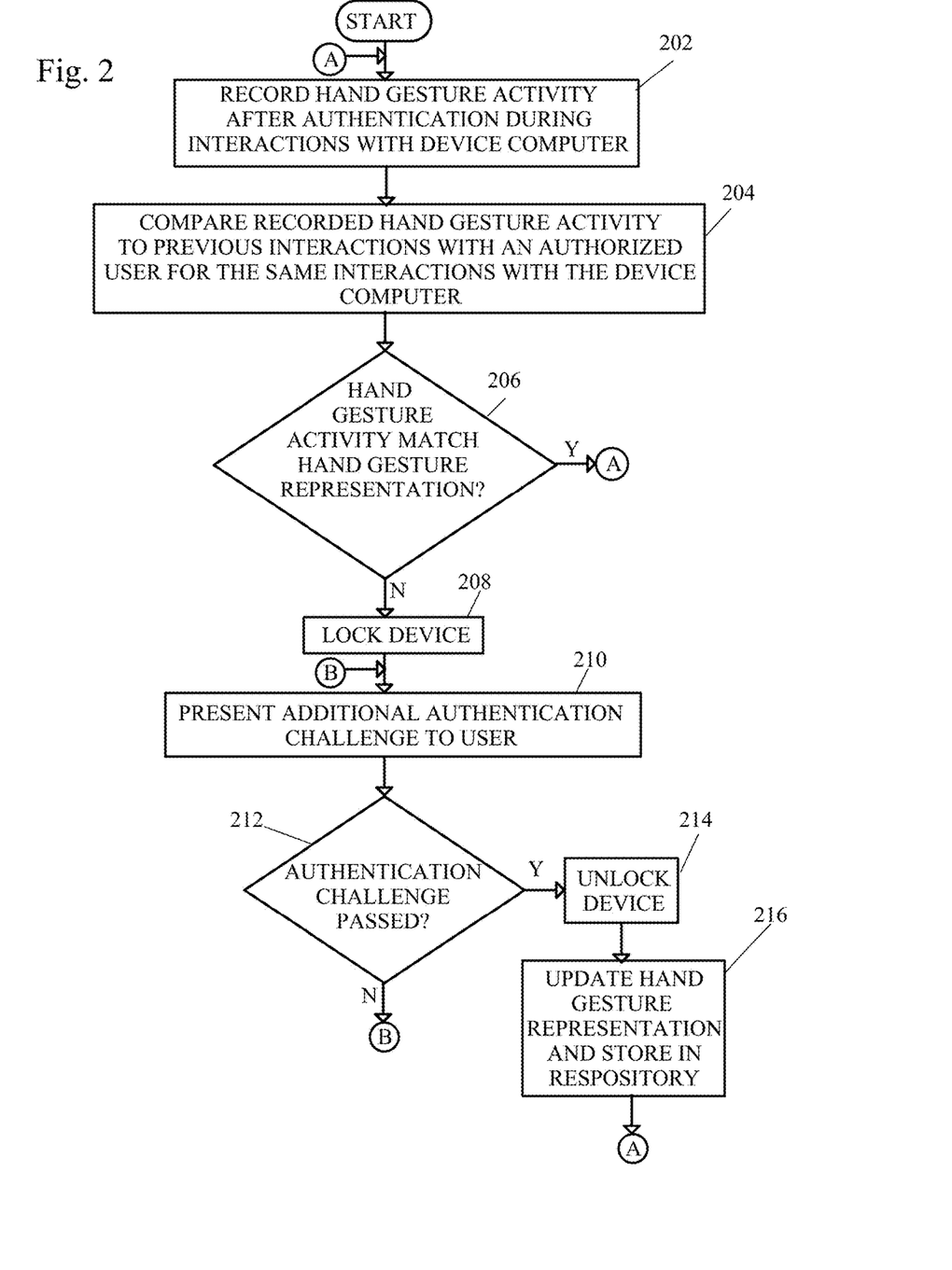
FIG. 2 shows a flow diagram of a method of supplemental hand gesture authentication of a user of a device computer.

FIG. 2 shows a flow diagram of a method of supplemental hand gesture authentication.

It should be noted that the method of the present invention takes place after initial authentication is passed to access the device computer and/or after authentication to use a specific application is allowed. The supplemental hand gesture authentication can take place any time after the authentication discussed above.

In a first step, after a first authentication to access the device computer and/or an application of the device computer 52, hand gesture activity of the user with an interface of the device computer 52 is recorded during interaction with applications of the device computer (step 202), for example by the authentication program 66. The authentication program 66 may include a recording module for capturing the hand gesture activity of the user. The hand gesture activity may be stored in a repository 53 or other storage device. The storage device 830, 926 may be part of the device computer 52 or be a separate repository 53 accessible by the device computer 52 through the network 50. The hand gesture activity may be specific to specific applications. In other words, the user may hold the device computer 52 differently when scrolling through images versus reading websites, or reading and responding to e-mail. The hand gesture activity is specific for each of the applications.

The hand gesture activity includes characteristics, with the characteristics of the hand gesture including, but is not limited to, placement of fingers of the user on the device computer 52, which hand or hands of the user holds the device computer 52; orientation of the device computer 52 (portrait or landscape), and angle of the device computer 52 when being held by the user. Additionally, the distance of the device computer 52 from the user's face may also be measured and recorded. Furthermore, images of the user's facial features relative to the device computer 52 may be used to determine sentiment relative to the application being interacted with.

It should be noted that the hand gesture activity which is recorded is not taking place during actual authentication challenges, but is during use of the device computer 52 with specific applications or activities. For example, listening to music through a specific application, checking e-mail through an application, etc.

It should be noted that data can be recorded for more than one authorized user of a device computer 52. Different authentication challenges and the frequency of the authentication of the user may be set differently for different users of the same device computer. For example, there may be different authentication challenges and/or frequency of the authentication of the user set for an adult than a child.

An example of the recorded data captured from a user by the recorded module of the authentication program 66 may include the following:

User A—Application A, hand gesture activity: Left hand holding the device, 4 fingers on the right edge of the device, position with each of the first four fingers 1 cm apart and a finger of the right hand on the left edge of the device, located 3 cm from the top left corner of the device.

User A—Application B, hand gesture activity: right hand holding, four fingers touching a back interface, 2 cm apart, and a thumb touching an interface on the front of the device, with the device angled 30 degrees from horizontal.

User B—Application B; hand gesture activity: left hand holding, two fingers touching a back interface, spaced 2 cm apart, three fingers touching the front interface of the device, with the device angled at 45 degrees from horizontal.

Next, the recorded hand gesture activity of the user with the current application interacted with by the user on the device computer 52 is compared to hand gesture activity from previous interactions which have been compiled together to form a hand gesture representation, for the same application or for completing the same activity (step 204), for example by the authentication program 66.

The comparison of the recorded hand gesture activity to the hand gesture representation of an authorized user may take place at a designated interval or frequency. The interval or frequency may be set by the authorized user. Alternatively, the designated interval or frequency may higher for applications or activities which expose confidential information of a user, after at least a first authentication challenge has been overcome.

In yet another embodiment, the frequency in which the comparison of the recorded hand gesture activity to the hand gesture representation of an authorized user may increase as the location of the device computer 52 is detected as being located in a location which is not frequently visited by the authorized user. Similarly, the frequency may be decreased when the authorized user is detected as being in their home or other frequently visited location.

The hand gesture representation may be part of a larger user profile which includes additional information, common usage patterns, and biometric readings used to represent captured behavior of the user during the use of the device computer 52 during an activity. For example, the hand gesture representation may include a distance and position the device computer 52 is held in relative to a user's face, common locations of use of the device computer 52 by the user, frequency of a user of certain applications of the device computer 52, frequency in which notifications are checked on the device computer 52 by an authorized user, and other behavioral cues which can be ascertained with a frequency during the user's use of the device computer 52 during an activity.

For example, an authorized user of a device computer 52 always checks application (App) 1 first, then App 2 and then App 5 when no push notifications are present for the user. When notifications are present for the user on the device computer 52, the authorized user typically reviews the notifications through the application in which they were generated (e.g. App 3 and App 4) and then looks at App 1 and App 2 then App 5.

If the current hand gesture activity matches the hand gesture representation for the authorized user with the activity or the application (step 206), the method returns to step 202 of recording hand gesture activity.

If the current hand gesture activity does not match the hand gesture representation for the authorized user with the activity or application (step 206), the device computer 52 or the application currently being used by the user is locked (step 208) by the authentication program 66.

It should be noted that a "match" may be defined as a number of recorded characteristics or recorded gestures during current use being within a predefined threshold or range of the hand gesture representation for the authorized user. The predefined threshold may be a percentage of the recorded gestures representing current use, with each of the measurements within the characteristics being within ten percent of the values in the hand gesture representation. For example, the current hand gesture activity of a user using Application A records the following: Left hand holding the device, 5 fingers on the right edge of the device, position with each of the first four fingers 1.2 cm apart and a finger of the right hand on the left edge of the device, located 2.8 cm from the top left corner of the device, wherein the hand gesture representation for the authorized user is as follows: Left hand holding the device, 4 fingers on the right edge of the device, position with each of the first four fingers 1 cm apart and a finger of the right hand on the left edge of the device, located 3 cm from the top left corner of the device. A match would not be present if the current use recorded right hand holding the device, three fingers on the right hand, with the three finger spaced 2 cm apart.

The predefined threshold or range of values may be set by an administrator or by the authorized user of the device.

The authentication program 66 presents additional authentication challenges to the user (step 210).

The additional authentication challenges may require the user to provide a typed password, spoken password, fingerprint, other biometric readings, or other identification means.

A level of difficulty of the additional authentication challenges can vary according to the amount of confidential data exposed during use of an application of the device computer 52 or the amount of discrepancies between the hand gesture representation of an activity of a user and the currently recorded hand gesture activity.

If the additional authentication challenge presented to the user is not passed (step 212), the device computer 52 remains locked and additional authentication challenges may be presented, as the method returns to step 210. It should be noted that there may be a limited number of times additional authentication challenges will be presented before the user may have to validate their identity with another source associated with the device computer.

If the additional authentication challenge presented to the user is passed (step 212), the device computer 52 or the application is unlocked for use (step 214) and the authentication program 66 updates the hand gesture representation of the user with the activity of the application and stores the updated hand gesture representation in a repository (step 216), for example repository 53 or device storage 830, 926 and the method returns to step 202 or monitoring hand gesture activity.

In one embodiment, once an additional authentication challenge has been successfully passed by a user, the hand gesture activity can continue to be recorded, but the comparison to a hand gesture representation for that activity may be suspended for a certain amount of time. The suspension of time may be based on when the user changes activities, logs back into the device computer 52 or other criteria. The suspension of time may be set by an authenticated user of the device computer 52.

For example, after a user has already passed an initial authentication challenge to gain initial access to the device, a recording module of the authentication program 66 records hand gesture activity of the user. The authentication program 66 records that each time a user watches a video, the user holds the device computer 52 with one thumb on a first side of the device computer 52, and three fingers on the opposite side of the device computer, with each of the three fingers on the left side approximately 0.5 cm apart, where the first of the three fingers is between 2-3 cm from a top edge of a device computer 52. A supplemental authentication challenge would be provided to the user through the device computer if, while watching a video, the device computer is held only in one hand, or in two hands with a first hand where the two fingers are 0.1 cm apart, as these differences in how the device computer 52 is being held while interacting with the video application is significant.

FIG. 3 illustrates internal and external components of a server computer 54 in which illustrative embodiments may be implemented. In FIG. 3, a server computer 54 include respective sets of internal components 800b and external components 900b. Each of the sets of internal components 800b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and authentication program 66 are stored on one or more of the computer-readable tangible storage devices 830 for execution by one or more of the processors 820 via one or more of the RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800b also includes a R/W drive or interface 832 to read from and write to one or more portable computer-readable tangible storage devices 936 such as a CD-ROM, DVD, memory stick, magnetic tape, magnetic disk, optical disk or semiconductor storage device. Authentication program 66 can be stored on one or more of the portable computer-readable tangible storage devices 936, read via R/W drive or interface 832 and loaded into hard drive 830.

Each set of internal components 800b also includes a network adapter or interface 836 such as a TCP/IP adapter card. Authentication program 66 can be downloaded to the device computer 52 and server computer 54 from an external computer via a network (for example, the Internet, a local area network or other, wide area network) and network adapter or interface 836. From the network adapter or interface 836, authentication program 66 is loaded into hard drive 830. Authentication program 66 can be downloaded to the server computer 54 from an external computer via a network (for example, the Internet, a local area network or other, wide area network) and network adapter or interface 836. From the network adapter or interface 836, authentication program 66 is loaded into hard drive 830. The network may comprise copper wires, optical fibers, wireless transmission, routers, firewalls, switches, gateway computers and/or edge servers.

Each of the sets of external components 900b includes a computer display monitor 920, a keyboard 930, and a computer mouse 934. Each of the sets of internal components 800b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Authentication program 66 can be written in various programming languages including low-level, high-level, object-oriented or non object-oriented languages. Alternatively, the functions of an authentication program 66 can be implemented in whole or in part by computer circuits and other hardware (not shown).

FIG. 4 is a block diagram of components of a device computer 52 in accordance with an embodiment of the present invention. In an exemplary embodiment, device computer 52 includes one or more processors 820, one or more computer-readable RAMs 822, one or more computer-readable ROMs 824, and one or more computer-readable tangible storage devices 830 on one or more buses 826. One or more operating systems 828, one or more apps or programs 842, and authentication program 66 are stored on the one or more computer-readable tangible storage devices 830 for execution by one or more of the processors 820 via one or more of the RAMs 822 (which typically include cache memory). In the illustrated embodiment, each of the computer-readable tangible storage devices 830 is a semiconductor storage device such as ROM 824, EPROM, flash memory or any other computer-readable tangible storage device that can store a computer program and digital information. Alternatively, each of the computer-readable tangible storage devices 830 is a magnetic disk storage device of an internal hard drive.

Device computer 52 also includes a read/write (R/W) interface 832, for example, a USB port, to read from and write to external computing devices or one or more portable computer-readable tangible storage devices such as a CD-ROM, DVD, memory stick, magnetic disk, optical disk or semiconductor storage device. The apps and programs 842 and the authentication program 66 can be stored on the external computing devices or one or more of the portable computer-readable tangible storage devices, read via the R/W interface 832 and loaded onto the computer-readable tangible storage device 830.

Device computer 52 also includes a network adapter or interface 836, such as a TCP/IP adapter card or wireless communication adapter (such as a 4G wireless communication adapter using OFDMA technology). The apps and programs 842 and the authentication program 66 can be downloaded to device computer 52 from an external computer or external storage device via a network (for example, the Internet, a local area network, a wide area network, or a wireless network) and network adapter or interface 836. From the network adapter or interface 836, the apps and programs 842 and the user authentication program 66 are loaded into computer-readable tangible storage device 830. The network may comprise copper wires, optical fibers, wireless transmission, routers, firewalls, switches, gateway computers and/or edge servers.

Device computer 52 also includes a touch screen 844, a camera 848, sensors 846, for example, touch screen sensors and magnetically sensitive circuits, and device drivers 840 to interface to touch screen 844 for imaging, to sensors 846 for pressure sensing of alphanumeric character entry and user selections and for detecting magnetic flux and polarity. The device drivers 840, R/W interface 832 and network adapter or interface 836 comprise hardware and software (stored in computer-readable tangible storage device 830 and/or ROM 824).

It should be appreciated that FIG. 4 provides only an illustration of one implementation and does not imply any limitations with regard to the environments in which different embodiments may be implemented. Many modifications to the depicted environment may be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method and program product have been disclosed for selecting a user environment based on a device cover. However, numerous modifications and substitutions can be made without deviating from the scope of the present invention. Therefore, the present invention has been disclosed by way of example and not limitation.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of supplemental authentication based on hand gesture activity of a user with an application of a device computer comprising the steps of:

after a user has completed a successful authentication challenge to initially access at least the device computer, the device computer recording hand gesture activity of the user during current use of the application of the device computer at a time other than during an authentication challenge provided to the user for user input;

the device computer comparing the recorded hand gesture activity of the user during current use of the application of the device computer at a time other than during an authentication challenge provided to the user for user input to previously recorded hand gesture activity during use of a same application of the device computer to provide a supplemental authentication of the user of the device computer; and when the recorded hand gesture activity of the user does not match the previously recorded hand gesture activity during use of the same application, the use of the application of the device computer is halted and an additional authentication challenge requiring input from the user is presented to the user; and when the additional authentication challenge is passed, resuming the use of the application of the device computer for the user, and updating a hand gesture representation associated with the application of the user with the device computer which is used to compare to current user usage of the application.

2. The method of claim 1, wherein the step of the device computer comparing the recorded hand gesture activity of the user during current use of the application of the device computer to previous recorded hand gesture activity during use of the same application of the device computer to provide a supplemental authentication of the user of the device computer, takes place at an interval, wherein a frequency of the interval is determined by an amount of confidential data exposed through use of the application by the user.

3. The method of claim 1, wherein the hand gesture activity further comprises common locations in which the user uses the application on the device computer.

4. The method of claim 1, wherein the hand gesture activity further comprises a distance the user holds the device computer from a face of the user.

5. The method of claim 1, wherein the hand gesture activity comprises a distance between the fingers of the user when holding the device computer.

* * * * *